United States Patent [19]

Lewis

[11] Patent Number: 4,462,165
[45] Date of Patent: Jul. 31, 1984

[54] THREE AXIS ORIENTATION SENSOR FOR AN AIRCRAFT OR THE LIKE

[75] Inventor: Richard W. Lewis, Derby, Kans.

[73] Assignee: The Boeing Company, Seattle, Wash.

[21] Appl. No.: 462,307

[22] Filed: Jan. 31, 1983

[51] Int. Cl.³ .................................... G01C 17/28
[52] U.S. Cl. ................................ 33/361; 33/355 R; 33/363 Q
[58] Field of Search ............... 33/361, 355 R, 363 Q, 33/363 R, 366, 356, 317, 319; 324/260, 247

[56] References Cited

U.S. PATENT DOCUMENTS

| 2,373,096 | 4/1945 | Bonell | 33/361 |
| 3,127,559 | 3/1964 | Legg et al. | 324/260 |
| 3,133,244 | 5/1964 | Wojtulewicz | 33/356 |
| 3,136,944 | 6/1964 | Hafner | 324/247 |
| 3,541,853 | 11/1970 | Anderson | 33/356 |
| 3,626,344 | 12/1971 | Shaternikov | 324/260 |
| 3,744,312 | 7/1973 | Anderson | 33/356 |
| 3,873,914 | 3/1975 | Kesselring | 33/361 |
| 3,942,258 | 3/1976 | Stucki et al. | 33/361 |

Primary Examiner—Willis Little
Attorney, Agent, or Firm—Edwin H. Crabtree

[57] ABSTRACT

A three axis orientation sensor for sensing the orientation of an attached object such as an aircraft with respect to the earth's magnetic field. The sensor can be aligned and used in the presence of ferrous materials and magnetic fields which are inherent in the surrounding environment of the aircraft.

5 Claims, 5 Drawing Figures

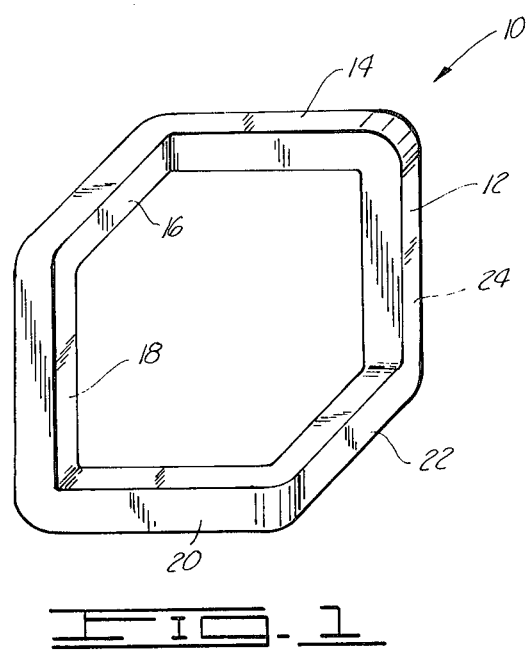
FIG-1
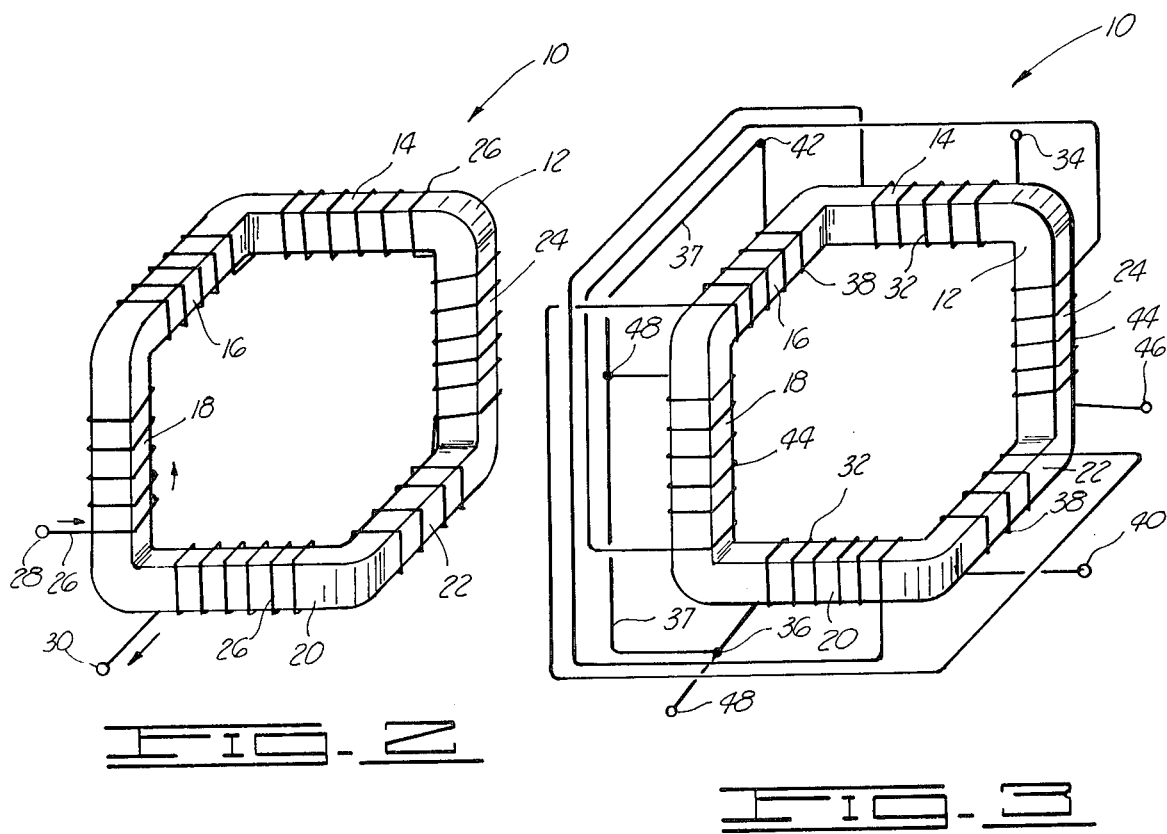
FIG-2
FIG-3

THREE AXIS ORIENTATION SENSOR FOR AN AIRCRAFT OR THE LIKE

BACKGROUND OF THE INVENTION

This invention relates to an orientation sensor and more particularly but not by way of limitation to a magnetic orientation sensor used for determining the orientation of an aircraft, a vehicle, a naval vessel and the like.

It is desirable to know the orientation of an aircraft in flight at all times. Visual sensing of the horizon generally provides this information, however, in some circumstances such as IFR flights, this external reference is lost and an internal or on board reference is required. A gyroscope will normally provide this type of reference. The gyroscope is subject to drift and precession and except for a more expensive three axis gyroscope, the gyroscope will tumble if the aircraft is maneuvered beyond certain limitations.

Further, magnetic heading sensors incorporated on aircraft have not been found to be reliable during pitch or turn maneuvers In the past, there have been various types of magnetic orientation sensors described in U.S. Pat. No. 2,403,347 to Depp et al, U.S. Pat. No. 2,998,727 to Baker, U.S. Pat. No. 3,696,518 to Leat, U.S. Pat. No. 3,873,914 to Kesselring and U.S. Pat. No. 3,942,258 to Stucki et al. None of the above mentioned patents specifically disclose the unique features and advantages of the subject invention as described herein.

SUMMARY OF THE INVENTION

The subject invention gives accurate headings during turns, provides aircraft orientation and does not drift, precess, tumble and is inexpensive when compared to similar types of magnetic orientation sensors.

The three axis orientation sensor may be easily aligned, operates in a ferrous environment and is not affected by maneuvers of the vehicle. A heading system for aligning the sensor may be used as described in U.S. Pat. No. 3,389,586 by the subject inventor and assigned to the assignee of record.

Also the invention provides an orientation sensor which can be automatically compensated for errors caused by the ferrous materials located in the surrounding environment.

Further, the invention provides an orientation of the aircraft wherein heading errors due to maneuvers are essentially eliminated.

The three axis orientation sensor for sensing the orientation of an aircraft or the like with respect to the earth's magnetic field includes a magnetic permeable core formed into a continuous closed loop. The loop includes three pairs of parallel legs. One pair of legs corresponds to an X axis. A second pair of legs corresponds to a Z axis and a third pair of legs corresponds to a Y axis. The core is wrapped with an exciter winding for exciting the core into saturation. The three pairs of legs are wound with three sets of sense windings for sensing and receiving output signals from each pair of parallel legs.

The advantages and objects of the invention will become evident from the following detailed description of the drawings when read in connection with the accompanying drawings which illustrate preferred embodiments of the invention.

BRIEF DESCRIPTION OF THE DRAWINGS

FIG. 1 is a perspective view of the magnetic permeable core.

FIG. 2 is a perspective view of the core with the exciter winding wound in a clockwise direction therearound.

FIG. 3 illustrates a perspective view of the core with the three sets of sense windings wound around the three pair of parallel legs.

DETAILED DESCRIPTION OF THE DRAWINGS

Figure 4:
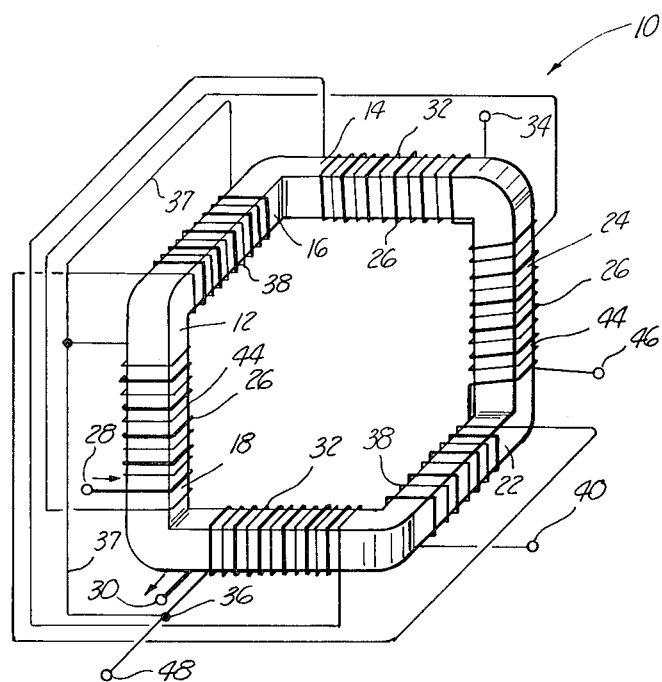
FIG. 4 illustrates the core with both the exciter winding and sense winding thereon.

In FIG. 1 the three axis orientation sensor is designated by general reference numeral 10. The sensor 10 includes a magnetic permeable core 12 formed in a continuous closed loop with three sets of parallel axis legs. The axis legs include a first X axis leg 14, a first Z axis leg 16, a first Y axis leg 18, a second X axis leg 20, a second Z axis leg 22 and a second Y axis leg 24. It can be appreciated that each of the X axis legs are parallel to each other along with the Z axis and the Y axis legs being parallel to each other. The core 12 may be made up of a continuously wound ribbon or a casting of permeable material and can be envisioned as six continuous edges of a cube.

In FIG. 2 the core 12 can be seen with an exciter winding 26 wound around the core 12. In operation the exciter winding is wound in the same direction either clockwise or counter clockwise around the six legs of the core 12. The number of turns for the exciter winding 26 is determined by the core material, cross sectional area of the core, the length of the core and the exciter voltage necessary to drive the core 12 into and out of saturation. The exciter winding 26 includes electrical connections 28 and 30 for applying voltage thereto.

In FIG. 3 the sensor 10 is shown with the core 12 receiving a first sense winding 32 evenly wrapped around the first X axis leg 14 and second X axis leg 20 and having an output connection 34 and a common connection 36 connected to a common lead 37. A second sense winding 38 is evenly wrapped around the first Z axis 16 and the second Z axis leg 22 with an output connection 40 and a common connection 42 attached to the common lead 37. The first Y axis 18 and second Y axis 24 are wrapped with a third sense winding 44 having an output connection 46 and a common connection 48.

The three output connections 34, 40 and 46 provide the three signals from the three sense windings 32, 38 and 44 with respect to a common output connection 48 connected to the common lead 37. The sense windings are wound and interconnected as shown so as not to produce an output signal due to the exciter winding 26 being energized. By this the sense windings are electrically connected together so as to cancel any output produced by the magnetic fields generated by the exciter winding 26.

In FIG. 4 the completed sensor 10 is shown having the exciter winding 26 wrapped around the three parallel axis legs along with the individual sense windings 32, 38 and 44 wrapped around the parallel X axis legs, Z axis legs and Y axis legs.

In operation, the exciter winding 26 is energized to drive the core 12 into and out of saturation. This action produces a change in flux density due to an external magnetic field (such as the earth's field) that passes through the core.

This change is sensed by each of the three sets of the orthogonal sense windings 32, 38 and 44 and can be vectorally combined to provide the aircrafts orientation. Note that there must be at least one more sensor of some type to remove ambiguity. It is also required that the earth's magnetic field be mapped rather extensively over the entire earth where the orientation sensor is to be used. It will be appreciated from the foregoing that this invention provides a simple orientation sensor 10, especially suitable for small aircraft. Because the orientation sensor 10 has no moving parts, is low cost, many of the above discussed disadvantages of the prior art orientation sensors are overcome.

Figure 5:
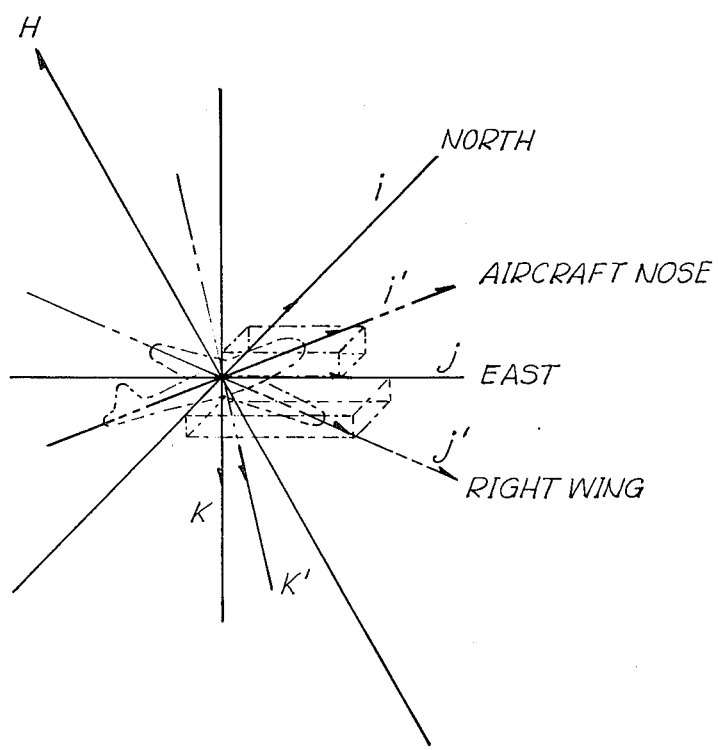
FIG. 5 illustrates a perspective view of an aircraft oriented with the earth's coordinate system.

In FIG. 5 two coordinate systems are shown, one for the earth and one for the aircraft 50. The earth's magnetic field H is also shown. The earth's coordinate system has three unit vectors i, j, k. i is along the north vector, j is along an east vector with k along the gravitational vector of the earth.

The magnetic field vector H, has a relationship to the earth which is dependent on the location on the earth. There is a dip and deviation angle for this vector which changes over the earth. This is not presently being used in this computation but would be required in the actual use.

The magnetic field vector, H, can be found from the magnetometer readings x, y, and z. $H = i'x + j'y = k'z$. If deviation is removed then $H = -iH_x - kH_z$, $H_x > 0$, $H_z > 0$. It can be shown that $K = i'K_x + j'K_y + k'K_z$.

Also
$$j = (H X K)/H_x = 1/H \begin{vmatrix} i' & j' & k' \\ x & y & z \\ K_x & K_y & K_z \end{vmatrix}$$

$j = [(YK_z - zKY)/H_x]i' + [zK_x - xK_z)H_x]j' + [(xK_y - YK_x)/H_x]k'$ $i = jXk = [(HXK)XK]/H_x = [(KX(KXH)]/H_x =$ $[(KX(K*H) - H]/H_x$ $i = [(K_xH_z - x)/H_x]i' + [(K_yH_z - Y)/H_x]j' + [(K_zH_z - z)/H_x]k'$ where $H_z = (K_x x + K_y y + K_z z)$
and $1 = K_x^2 + K_y^2 + K_z^2$
PITCH $= -SIN^{-1}(K_x)$
HEADING $= COS^{-1}[(K_xH_z - x)/(H_x(K^2 + K^2)^{\frac{1}{2}}]$
ROLL $= COS^{-1}[(K_z/(K_y^2 + K_z^2)^{\frac{1}{2}})]$
Note that * is the dot product while X is the cross product.
i—North Unit Vector
j—East Unit Vector
K—Gravitational Unit Vector (Down)
i'—A/C Nose Unit Vector
j'—A/C Right Wing Unit Vector
k'—A/C Vertical Down Unit Vector i'Xj'
H—Magnetic Field Vector Changes may be made in the construction and arrangement of the parts or elements of the embodiments as described herein without departing from the spirit or scope of the invention defined in the following claims.

What is claimed is:

1. A three axis orientation sensor for sensing the orientation of an aircraft or the like with respect to the earth's magnetic field, the sensor comprising:
    a magnetic permeable core formed in a continuous closed loop, the core including three pairs of legs, one pair of legs corresponding to an X axis, a second pair of legs corresponding to a Z axis and a third pair of legs corresponding to a Y axis;
    means for electrically energizing the core into and out of magnetic saturation; and
    means for sensing and receiving output signals from each pair of legs.

2. The sensor as described in claim 1 wherein the means for electrically energizing the core is an exciter winding wound in a clockwise or counter clockwise manner on the core and therearound.

3. The sensor as described in claim 1 wherein the means for sensing and receiving output signals from the three pairs of legs are sense windings wound around the three pairs of parallel legs.

4. A three axis orientation sensor for sensing the orientation of an aircraft or the like with respect to the earth's magnetic field, the sensor comprising:
    a magnetic permeable core formed in a continuous closed loop, the core including a first X axis leg, a first Z axis leg, a first Y axis leg, a second X axis leg parallel to the first X axis leg, a second Z axis leg parallel to the first Z axis leg, and a second Y axis leg parallel to the first Y axis.
    an exciter winding wound clockwise or counter clockwise around the permeable core, the exciter winding wound in a spaced relationship around each of the legs for electrically energizing the core into and out of magnetic saturation;
    a first sense winding wound around the two X axis legs;
    a second sense winding wound around the two Z axis legs; and
    a third sense winding around the two Y axis legs, the first, second and third sense windings receiving individual output signals from the three pair of parallel legs when the core is driven into and out of saturation by the exciter winding.

5. The sensor as described in claim 4 wherein one end of the three sense windings are connected together to form a common output signal, the other ends of the windings providing the individual output signals.

* * * * *